United States Patent [19]

Leroy et al.

[11] Patent Number: 4,627,954

[45] Date of Patent: Dec. 9, 1986

[54] PROCESS FOR DETECTING FAULTS IN THE POWER DISTRIBUTION OF A PRESSURIZED WATER NUCLEAR REACTOR CORE AND DEVICE FOR MAKING USE OF THIS PROCESS

[75] Inventors: Jean Leroy, Gif-sur-Yvette; Pierre Ruiz, Blanc Mesnil, both of France

[73] Assignee: Framatome & Cie., Courbevoie, France

[21] Appl. No.: 607,472

[22] Filed: May 7, 1984

[30] Foreign Application Priority Data

May 19, 1983 [FR] France .................. 83 08276

[51] Int. Cl.$^4$ ............................... G21C 7/36
[52] U.S. Cl. ............................ 376/216; 376/215; 376/217; 376/219
[58] Field of Search .............. 376/216, 215, 217, 219

[56] References Cited

U.S. PATENT DOCUMENTS 4,318,778 3/1982 Musick .................. 376/216
4,386,048 5/1983 Humphries .............. 376/216

*Primary Examiner*—Donald P. Walsh
*Attorney, Agent, or Firm*—Pollock, Vande Sande & Priddy

[57] ABSTRACT

Process and device for the detecting of faults in the distribution of the power of the core (2) of a pressurized water nuclear reactor, in which at least one parameter representing the power of the core (2) is measured, each parameter being measured at a determined number of points. For each parameter, the difference between the two extreme measured values and the ratio of this difference to the smallest measured value are determined, and this ratio is compared to a set value, a fault being detected if this ratio is greater than the set value. The sensors (4, 9) are arranged symmetrically close to the periphery of the core (2) and a further sensor (9) is placed close to the center of the core (2).

9 Claims, 4 Drawing Figures

PROCESS FOR DETECTING FAULTS IN THE POWER DISTRIBUTION OF A PRESSURIZED WATER NUCLEAR REACTOR CORE AND DEVICE FOR MAKING USE OF THIS PROCESS

FIELD OF THE INVENTION

The present invention relates to the detection of faults in the distribution of power of the core of a pressurized water nuclear reactor.

BACKGROUND OF THE INVENTION

The power of a pressurized water nuclear reactor can be controlled by various means, including the control of the insertion or withdrawal of the control clusters, i.e. control rods of a neutron-absorbing material. These control clusters are arranged parallel to each other inside the reactor core, among the fuel elements.

It is highly important, when the reactor is operating, to control not only the power of the reactor but also the distribution of this power. In fact, a faulty distribution of the power can threaten the integrity of the fuel elements which can be subjected to an irreversible deterioration under the effect of the heat which they produce, if this quantity of heat is too great to be absorbed and carried away by the heat transfer fluid or if the circulation of the heat transfer fluid is inadequate. The two phenomena which must, above all, be avoided are, on the one hand, the boiling criticality of the pressurized water in contact with the fuel elements and, on the other hand, the melting of the fuel. The boiling criticality can lead to the formation of a film of steam along the fuel elements, this film prohibiting the high exchanges between the fuel element and the pressurized water, owing to a calefaction phenomenon. As for the melting of the fuel, this is due to an excessive evolution of power reflected in a local rise in temperature up to the melting point of the material; the melting is produced when the value of the power per unit length, or linear power, exceeds a certain threshold.

Both the abovementioned phenomena, which threaten the integrity of the fuel elements, can be due to a faulty position of the control clusters: an untimely fall of a control cluster which is unhooked from its control shaft, an unhooked cluster which remains completely inserted at the start-up of the reactor, or an offset of a cluster relative to the neighboring clusters.

It is known to locate the position of the shafts for control of the clusters but, in the case of a cluster which is unhooked from its control shaft, for example, the location of the position of the control shafts would not enable a fault to be detected.

SUMMARY OF THE INVENTION

This is why the object of the present invention is a process for detecting faults in the distribution of the power of the core of a pressurized water nuclear reactor, which makes it possible to detect, with high sensitivity, all the faults in distribution of the power of the core, whatever their location in the core and whatever their cause. The object of the invention is also to be able to detect the faults with a high certainty even when some sensors are, for any reason, out of action.

The process for detecting faults in the distribution of the power of a pressurized water nuclear reactor according to the invention is a process wherein at least one parameter representing the power of the core is measured, each parameter being measured at a determined number of points, and, for each parameter, the difference between the two extreme measured values and the ratio of this difference to the smallest measured value are determined, and this ratio is compared to a set value, a fault being detected if this ratio is greater than the said set value.

In order to obtain an even higher sensitivity, it is possible, in addition, to calculate the derivative with respect to time of the said ratio and to compare this derivative to a set value, a fault being detected if this derivative is greater than the said set value.

Preferably, to obtain the optimum safety, the points for measuring each parameter are distributed in several groups, each point of a group having, in each other group, a homologous point for which the measurement of the said parameter is redundant; the process described earlier is then applied to each of the groups and safety measures are triggered if a fault is detected in at least n groups, n being a whole number fixed in advance, and smaller than the total number of groups.

The invention also relates to a device for making use of the abovementioned process. This device comprises at least eight measuring sensors arranged symmetrically close to the periphery of the core, each sensor being associated with at least two homologous sensors for which the measurement is redundant. In addition, the device comprises means for calculating the said ratio and for comparison to the said set value.

In a first embodiment of the device according to the invention, the measuring sensors are multi-level neutron flux measuring chambers outside the core.

In a second embodiment of the invention, the measuring sensors are temperature sensors.

In a third, preferred, embodiment, the measuring sensors consist of neutron flux measuring chambers and of temperature sensors.

In this case, each flux measuring chamber is associated with three other homologous chambers, situated at different levels, for which the measurement is redundant and the temperature sensors are each situated at the exit of a channel, i.e. at intervals between the fuel assemblies of the core, where they are associated with two homologous sensors for which the measurement is redundant.

The device according to the invention preferably comprises, moreover, close to the center of the core, a sensor for measuring a parameter representing the power at the center of the core, means for comparing the value measured by this sensor with the mean of the values measured by the sensors for measuring the same parameter which are placed close to the periphery of the core, and means for correcting the value measured by the sensor situated close to the center of the core in order to take account of the normal differences between the center and the periphery of the core, the said measuring sensor being associated with at least two homologous sensors for which the measurement is redundant.

BRIEF DESCRIPTION OF THE DRAWINGS

A preferred embodiment of the invention will now be described, by way of non-limiting example.

DETAILED DESCRIPTION

Figure 1:
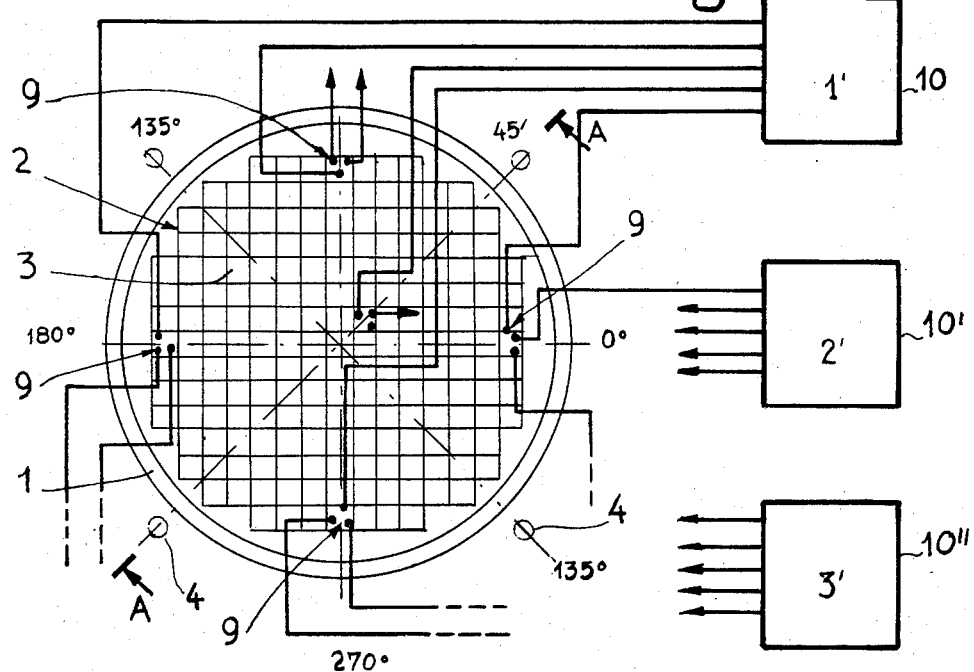
FIG. 1 shows a plan view of the core of a nuclear reactor equipped with sensors for measuring parameters representing the power of the core.
Figure 2:
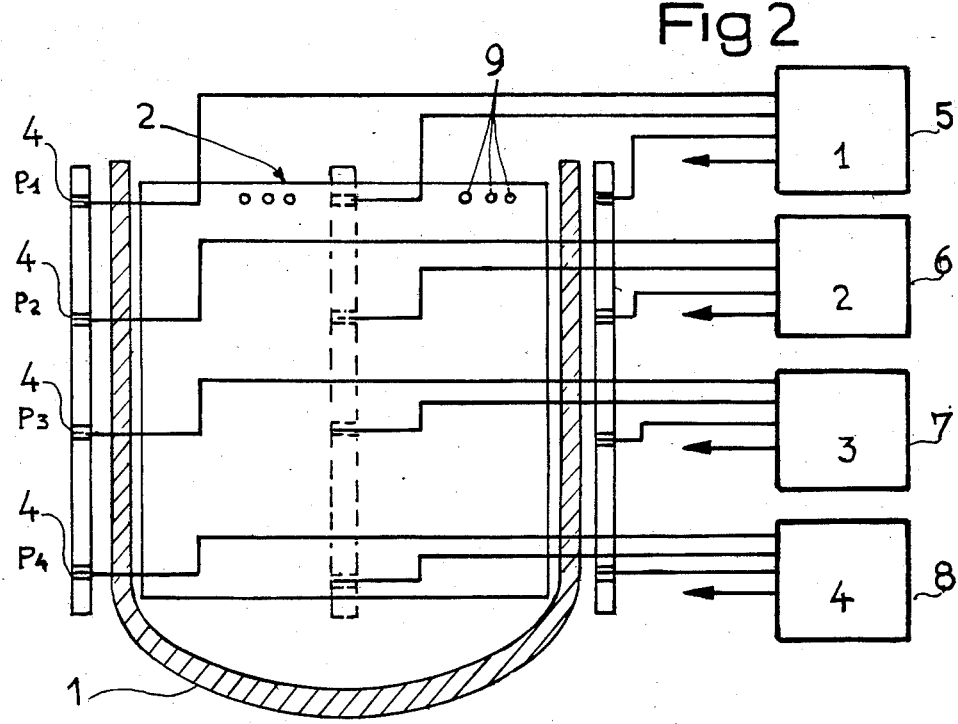
FIG. 2 shows a cross-section along A—A of FIG. 1.

Reference will first be made to FIGS. 1 and 2.

These figures show diagrammatically a reactor vessel 1 containing a core 2 in which are drawn a number of compartments 3 (see FIG. 1); these compartments contain, in a conventional manner, fuel elements arranged in parallel to each other, and some of them additionally contain control rods of a neutron-absorbing material, arranged in clusters, and capable of sliding in guide tubes placed in the fuel elements. The fuel elements and the clusters are not shown, so as not to over-complicate the figures.

The neutron flux measuring chambers 4 are arranged outside the core, close to its periphery, in four different parallel planes and, in each plane, at the ends of two axes of symmetry of the core. Thus, it is clearly seen that there are four chambers 4 situated at 45°, 135°, 225° and 315° in the plane of FIG. 1. The chambers 4 are completely conventional chambers which transmit a signal of neutron flux, a function of the power of the core. In what follows, the set of the neutron flux chambers 4 situated in one and the same plane will be called a "group". Thus, the four chambers shown in FIG. 1 belong to the same group. FIG. 2 shows the planes $P_1$, $P_2$, $P_3$ and $P_4$ comprising, respectively, the neutron flux chambers 4 belonging to group 1, group 2, group 3 or group 4. The signals transmitted by the neutron flux chambers 4 of each group enter one of the four devices for interpreting the signals of neutron flux chambers 5, 6, 7 or 8, according to whether they belong, respectively, to groups 1, 2, 3 or 4. The devices 5, 6, 7 or 8 are shown in greater detail in FIG. 3 which will be described later.

Temperature sensors 9 are arranged in threes in the plane of FIG. 1, at the periphery of the core, and near the center of the core. These sensors 9 are situated in only one plane, at the exit of the channels in which the primary fluid circulates. The values measured by the sensors 9 are therefore the values of the exit temperature of the primary fluid at various exit points of this fluid and represent the power of the reactor. (The entry temperature of the primary fluid is assumed to be the same for all the channels; a possible variation in this temperature therefore leads to an identical variation of all the values measured by the sensors 9 and does not interfere with the detection of the faults in the power distribution). The sensors 9 are arranged in two perpendicular axes situated in the plane of FIG. 1, at 0°, 90°, 180° and 270°, where the peripheral sensors are concerned, the other three sensors being situated close to the central cluster. The two axes on which the peripheral sensors are situated form the bisectors of the angles formed by the axes on which the neutron flux chambers are situated. The temperature sensors 9 form three groups, 1', 2' and 3', each group consisting of five elements situated, respectively, at 0°, 90°, 180° and 270°, and close to the center of the core. Since the temperature measured can be considered to be the same for the three sensors situated at the exit of the same channel, each sensor of a group therefore has a homologous temperature sensor carrying out a redundant measurement in the other groups, in the same way as the four neutron flux chambers 4 situated one above another at the various levels carry out redundant flux measurements.

The signals transmitted by the temperature sensors of the same group enter a device for interpreting the signals 10, 10' or 10". These devices are three in number, each device corresponding to a group of sensors 9. In FIG. 2, the devices 10, 10' and 10" are not shown.

Figure 3:
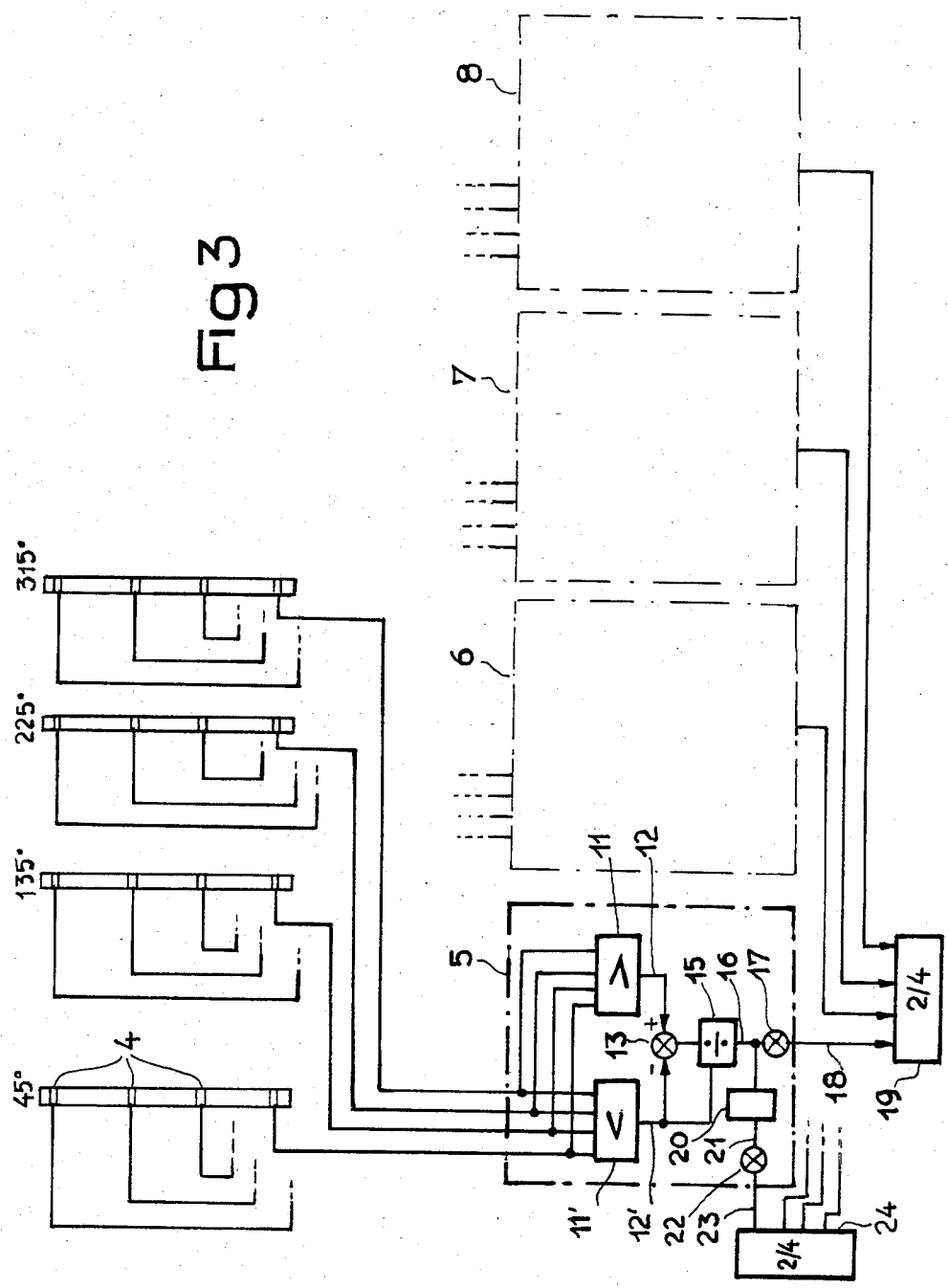
FIG. 3 shows the device for interpreting the signals of measurement of neutron flux measured by the flux measuring chambers of FIGS. 1 and 2.

We shall now refer to FIG. 3 which shows in detail the device for interpreting the signals transmitted by the neutron chambers 4. The interpretation of the signals of group 1 only will be described, the interpretation of the signals of groups 2, 3 and 4 being analogous. The signals of flux measurement at a level, i.e., the signals of the chambers 4 situated in one and the same plane, at 45°, 135°, 225° and 315°, are applied to the input of an interpreting device, namely, for the group 1 described here, the device 5. The signals first enter two selector circuits 11 and 11', the first circuit, 11, selects the biggest signal and the second circuit, 11', selects the smallest signal among the four signals applied. The two output signals of these circuits 11 and 11', namely, 12 and 12' are compared at 13, and the signal 14 thus obtained is divided at 15 by the signal 12', namely, the smallest signal. The output signal 16 represents a dissymmetry in the distribution of the core power. This signal 16 is applied to a threshold relay 17 which, depending on a set value, delivers a logic signal as evidence of a fault in distribution of the core power. This signal is shown as 18. The signals which are analogous to signals 18, produced by devices 6, 7 and 8 corresponding to groups 2, 3 and 4, are applied, simultaneously with the signal 18 produced by the device 5, to a device 19 having a 2/4 majority logic. Thus, if at least two of the signals such as 18 exceed a certain threshold, safety measures are triggered, for it is considered that a fault is detected.

The signal 16 is also applied to a unit 20 making it possible to obtain the signal 21 representing the time derivative of the signal 16. This signal 21 is applied to a threshold relay 22 which compares it to an internal set value. The signal produced by this relay 22 is denoted by 23 and is applied to a device 24 with 2/4 majority logic. Into this device 24 are also introduced the signals produced by devices 6, 7 and 8, which are analogs to the signal 23 but relate to the groups 2, 3 and 4. Safety measures are taken when at least two of the signals 23 exceed a certain threshold. In this way, fugitive faults in distribution of the core power, corresponding to a transient imbalance of the latter, are detected.

Figure 4:
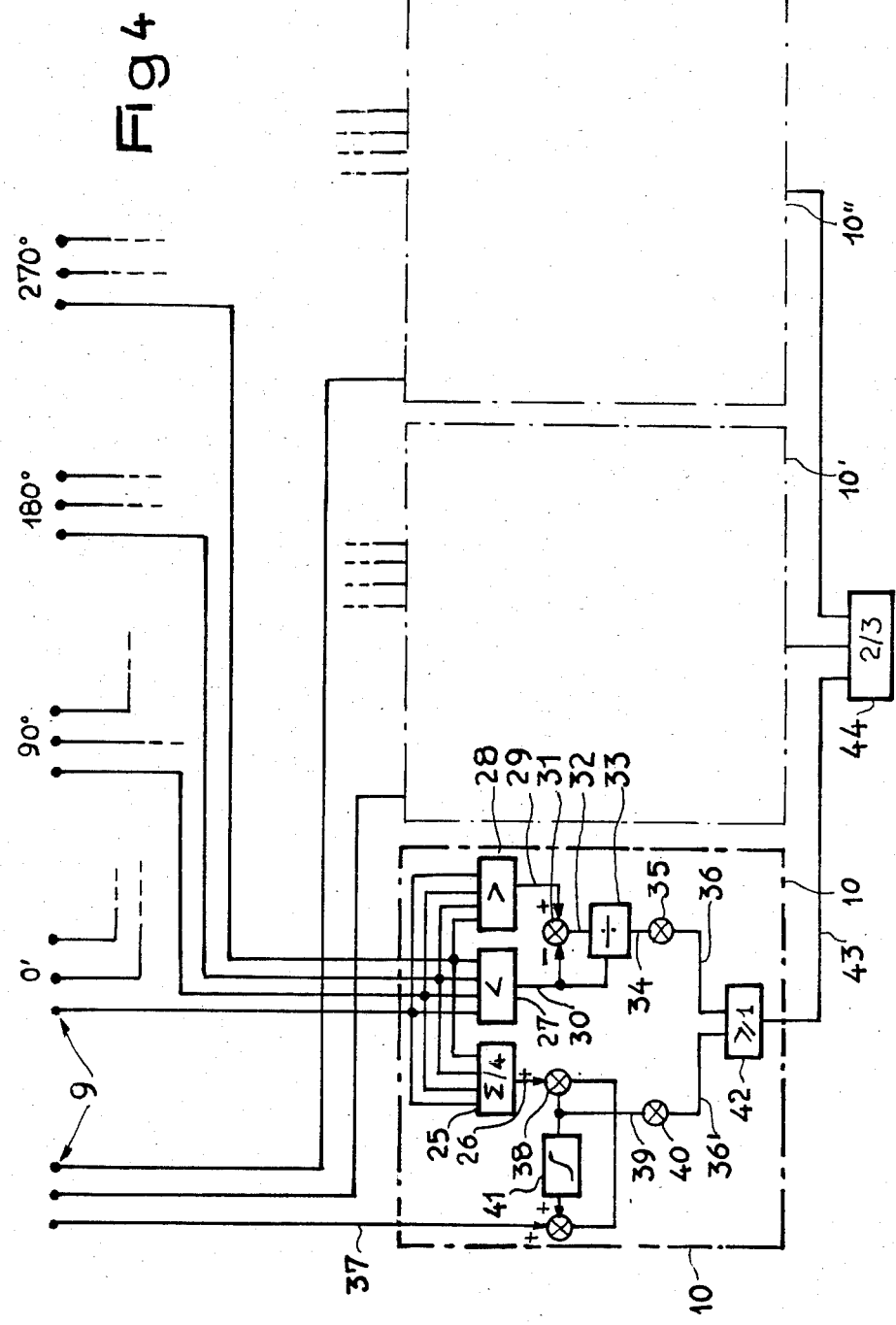
FIG. 4 is a figure which is analogous to FIG. 3 but applies to the signals from temperature measurement.

Reference will now be made to FIG. 4 which illustrates the devices 10, 10' and 10" for interpreting the signals transmitted by the temperature sensors 9. As before, only the device 10 corresponding to the group 1' will be described, the devices 10' and 10" corresponding to the other two groups being analogous.

The measurement signals of the peripheral thermocouples, i.e., those situated on the axes 0°, 90°, 180° and 270°, are applied, on the one hand, to a circuit 25 which determines a mean value signal 26 and, on the other hand, to two selector circuits 27 and 28 which determine the biggest signal 29 and the smallest signal 30.

The use of the signal 26 will be described later. The signals 29 and 30 are compared at 31 and the signal 32 produced by the comparator 31 is divided at 33 by the signal 30, namely, the smallest signal. The signal 34 thus obtained represents a dissymmetry in the distribution of core power. This signal 34 is applied to a threshold relay 35 which, depending on a set value, produces a logic signal 36.

The mean temperature signal 26 of the peripheral thermocouples is compared continuously to the measurement signal 37 of the central thermocouples. The comparator of these two signals is shown as 38. The output signal 39 of this comparator represents the difference between the temperature at the center and the mean temperature at the periphery of the core, and is applied to a threshold relay 40 making it possible to obtain a logic signal indicating a detection of dissymmetry between the center and the periphery of the core. An integrator 41 enables the signal 37 transmitted by the central thermocouple to be continuously reset in order to take account of the normal differences in power between the center of the core and the periphery of the core.

The signals 36 and 36' transmitted by the threshold relays 35 and 40 are applied to a logic device 42 whose output signal 43 is zero if the signals 36 and 36' are both zero, but is equal to one if at least one of the two signals 36 or 36' is equal to one, i.e., if a fault is detected at the periphery of the core or between the center and the periphery of the core.

The output signal 43 is applied, together with the analogous signals produced by the groups 2 and 3, to a device 44 with ⅔ majority logic. Thus, safety measures are taken if a fault in the power distribution is detected in at least two out of three of the groups of temperature sensors.

Thus, the invention permits a fault in distribution of the core power to be detected wherever this fault is situated, in one of the four core quadrants, on one of the four axes shown in FIG. 1 or at the center of the core. The invention makes it possible to detect not only the permanent faults but also, by means of the calculation of the derivative, the fugitive faults during the transient imbalances. The calculation procedure employed allows a highly sensitive detection of the faults. Furthermore, the fact that redundant measurements are employed introduces a high degree of safety, also enabling a possibly faulty group of sensors to be repaired without having to stop the operation of the core.

The choice and the location of the measurement sensors may vary as a function of the geometric structure of the core (square or hexagonal, for example), of the type of symmetry existing in the groups of control clusters which are operated simultaneously, and of the constraints which may be associated with the other functions of these detectors in the system protecting and controlling the reactor.

It is thus possible to employ the neutron flux chambers rather than the temperature sensors to control the center of the core. The device for the interpretation of the signals may be similar to the device as described for the interpretation of the signals of the central sensors for temperature measurement.

It is also possible to employ only sensors for temperature measurement or only chambers for neutron flux measurement.

It is also possible to place sensors inside the core and not only at the periphery. It would then be necessary to provide resetting devices to take account of the temperature differences which normally exist inside the core, the temperature decreasing from the center towards the periphery of the core.

Furthermore, the devices 19 and 24 could be designed differently, for example, with a ¾ majority logic.

The number of groups of temperature sensors could also be different, for example 4, the device 44 then having a 2/4 or ¾ majority logic.

We claim:

1. Process for detecting faults in the distribution of the core power of a pressurized water nuclear reactor, comprising the steps of
    (a) measuring at least one parameter representing the power of the core at a predetermined number of points in different radial positions with reference to said core;
    (b) determining for each parameter the difference between two extreme measured values (12 and 12'; 29 and 30) and the ratio (16; 34) of this difference to the smallest measured value (12'; 30);
    (c) comparing this ratio (16; 34) to a set value, a fault being detected if this ratio (16; 34) is greater than said set value.

2. Process as claimed in claim 1, wherein, in addition, a derivative (21) with respect to time of the said ratio (16) is calculated and said derivative (21) is compared to a set value, a fault being detected if this derivative is greater than said set value.

3. The detecting process as claimed in claim 1 or 2, wherein points (4; 9) for measuring each parameter are distributed in several groups (groups 1, 2, 3 and 4; groups 1', 2' and 3'), each point of a group having in each other group a homologous point (4; 9) for which the measurement of the said parameter is redundant, the process being applied to each of said groups (groups 1, 2, 3 and 4; groups 1', 2' and 3') and safety measures being triggered if a fault is detected in at least n groups, n being a predetermined whole number smaller than the total number of groups.

4. Device for use of a process for detecting faults in the distribution of the core power of a pressurized water nuclear reactor, comprising at least eight sensors for measuring (4, 9) at least one parameter representing the power of said core at different radial positions with reference to said core, said sensors being arranged symmetrically close to the periphery of said core, each sensor (4, 9) being associated with at least two homologous sensors for which the measurement is redundant, and further comprises means (5, 6, 7 and 8; 10, 10' and 10") for calculating the ratio (16, 34) and for comparison to the said set value.

5. Device as claimed in claim 4, wherein said sensors are multi-level neutron flux measuring chamber (4) outside said core.

6. Device as claimed in claim 4, wherein said sensors are temperature sensors (9).

7. Device as claimed in claim 4, wherein said sensors consist of neutron flux measurement chambers (4) and temperature sensors (9).

8. Device as claimed in claim 7, wherein each neutron flux measuring chamber (4) is associated with three other homologous chambers situated at different levels, for which the measurement is redundant, and wherein said temperature sensors (9) are each situated at the exit of a channel and are associated with two homologous sensors for which the measurement is redundant.

9. Device as claimed in any one of claims 4 to 8, further comprising, adjacent the center of said core, a sensor (9) for measuring a parameter representing the power at the center of said core, means for comparing (38) the value (37) measured by this sensor (9) with the mean (26) of the values measured by the sensor for measuring (9) the same parameter which are located adjacent the periphery of said core, and means for correcting (41) the value (37) measured by this sensor (9) to take account of the normal differences in power between the center and the periphery of the core, said measuring sensor (9) being associated with at least two homologous sensors (9) for which the measurement is redundant.

* * * * *